United States Patent

[11] 3,564,281

[72] Inventors Mitio Tokunaga;
Mitsuru Kawanami; Susumu Aikyo,
Yokohama, Japan
[21] Appl. No. 689,893
[22] Filed Dec. 12, 1967
[45] Patented Feb. 16, 1971
[73] Assignee Hitachi, Ltd.
Tokyo, Japan
a corporation of Japan
[32] Priority Dec. 23, 1966 41/83893
[33] Japan
[31] Feb. 1, 1967 42/6066

[54] HIGH SPEED LOGIC CIRCUITS AND METHOD OF CONSTRUCTING THE SAME

11 Claims, 10 Drawing Figs.

[52] U.S. Cl. 307/214, 307/254; 317/235; 307/215
[51] Int. Cl. H03k 19/40
[50] Field of Search 307/214, 254, 215, 203, 299; 317/235

[56] References Cited

UNITED STATES PATENTS

| | | | |
|---|---|---|---|
| 2,672,528 | 3/1954 | Shockley | 317/235 |
| 3,089,964 | 5/1963 | Bruce | 307/214 |
| 3,215,946 | 11/1965 | Likel | 307/254 |
| 3,304,431 | 2/1967 | Biard | 307/299 |
| 3,394,268 | 7/1968 | Murphy | 307/299 |

OTHER REFERENCES

EPSCO, Nov. 1958, Power Amplifier, Bulletin TDC-112, 1 pg.

Richards, Nov. 1957, Digital Computer Components and Circuits, p. 169.

*Primary Examiner*—Donald D. Forrer
*Assistant Examiner*—David M. Carter
*Attorney*—Craig, Antonelli, Stewart & Hill

ABSTRACT: A logic inverter having a transistor emitter follower output circuit and an input circuit including therein a multicollector transistor or two transistors whose bases and emitters are connected in parallel with each other. In the inverter, the two collectors of the multicollector transistor or of the two transistors in the input circuit are connected to the base and the emitter, which is the output terminal, of the emitter follower transistor, respectively. A plurality of such inverters are combined in such a manner that the bases and the output terminals of the emitter follower transistors are connected in multiple to provide a logic circuit.

INVENTORS
MITIO TOKUNAGA
MITSURU KAWANAMI
SUSUMU AIKYO

BY Craig & Antonelli

ATTORNEYS

INVENTORS
MITIO TOKUNAGA,
MITSURU KAWANAMI
SUSUMU AIKYO

BY Craig & Antonelli
ATTORNEYS

INVENTORS
MITIO TOKUNAGA, MITSURU KAWANAMI,
SUSUMU AIKYO

BY Craig & Antonelli

ATTORNEYS

HIGH SPEED LOGIC CIRCUITS AND METHOD OF CONSTRUCTING THE SAME

This invention relates generally to saturated binary logic circuits and more particularly to a method of constructing a logic circuit of the kind described above which is an indispensable part in an electronic computer, an electronic switching system and the like for the amplification and phase inversion of pulses. This invention relates also to a logic circuit of the above kind constructed in accordance with the above method.

Transistor binary logic circuits (hereinafter to be merely referred to as logic circuits for the sake of simplicity, employed heretofore in the art are generally classified into two groups, that is, saturated logic circuits including the RTL (Resistor Transistor Logic), DCTL (Direct Coupled Transistor Logic), DTL (Diode Transistor Logic), TTL (Transistor Transistor Logic), etc., and unsaturated logic circuits including the CML (Current Mode Logic which is also called ECL, Emitter Coupled Transistor Logic), etc. Both the saturated logic circuits and the unsaturated logic circuits have their slight modifications such, for example, as the LCDTL (Load Compensated DTL) which is a modification of the DTL. Generally, the saturated logic circuit is used for operations ranging from a low speed operation to a high speed operation, while the unsaturated logic circuit is chiefly used for a ultra-high speed operation. Further, the pulse amplifying and phase inversion circuit portion of the saturated logic circuit ranges from the simplest inverter circuit to a complex totem pole circuit.

The present invention is concerned with all of the saturated logic circuits specified above and has for its first object to provide a novel circuit structure which is free from defects inherent in each of the prior inverter circuit and the prior totem pole circuit.

The second object of the present invention is to provide a high speed logic circuit in which a logic terminal is provided independently of an output terminal so as to realize the execution of the simple and most basic logical operation of wired OR circuits.

The above and other objects, advantages and features of the present invention will become apparent from the following description with reference to the accompanying drawings:

Figure 5:
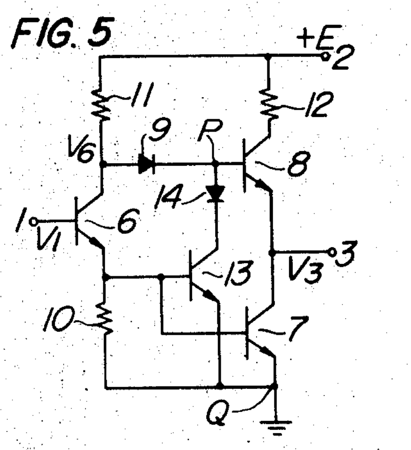
Figure 6:
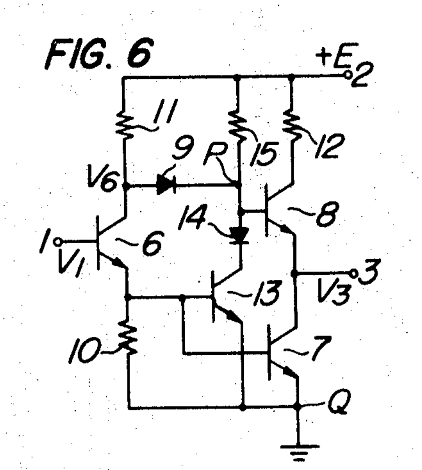
Figure 7A:
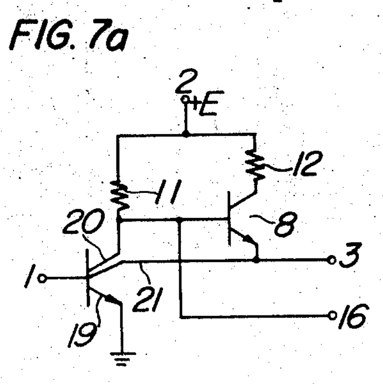
Figure 8:
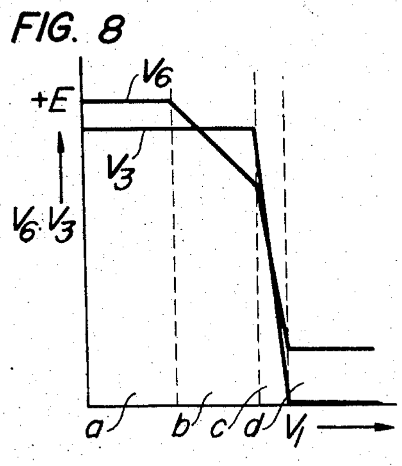
Figure 9:
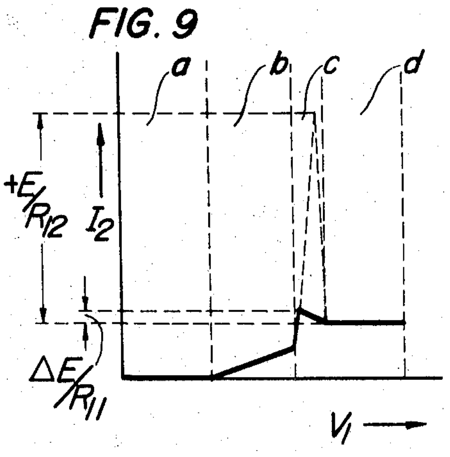
Figure 10:
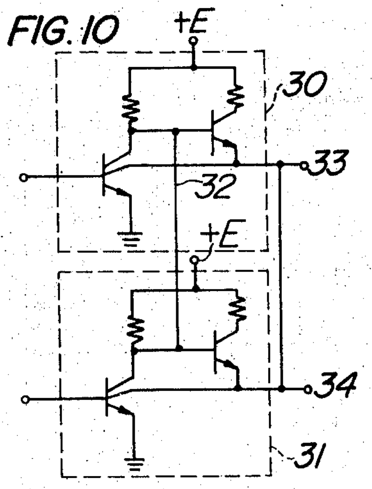
Figure 11:
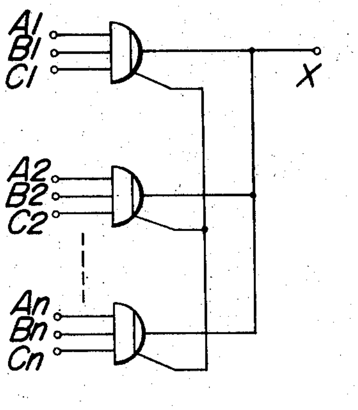
Figure 12A:
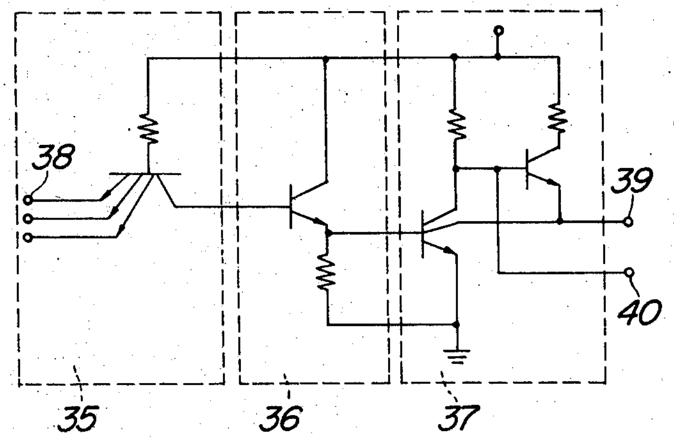
Figure 12B:
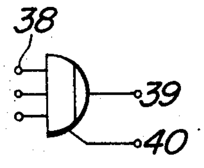

FIGS. 5, 6, 7*a* and 7*b* are circuit diagrams illustrating the structure of a few embodiments according to the present invention;

FIGS. 8 and 9 are graphic illustrations of the operation of the circuits shown in FIGS. 5 and 6;

FIG. 10 is a circuit diagram illustrating the structure of a logic circuit which comprises a parallel connection of the circuits shown in FIG. 7*a*;

FIG. 11 is a diagram illustrating the combination of the circuits for executing the logical function intended by the present invention; and FIGS. 12*a* and 12*b* are a circuit diagram illustrating the structure of another embodiment according to the present invention, and a symbolic representation of the circuit, respectively.

Figure 1:
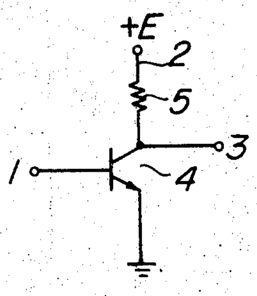
FIG. 1 is a diagram illustrating the basic configuration of a prior art pulse amplifying and inversion circuit in its simplest form.

Referring to FIG. 1, there is shown a prior art inverter circuit in its simplest form, which includes an input terminal 1 connected to the base of an NPN transistor 4, a terminal 2 for applying a collector supply voltage +E, an output terminal 3 and a resistor 5 having a predetermined function. As is commonly known, the transistor 4 in the inverter circuit shown in FIG. 1 is urged to its conducting state or to its cutoff state depending on the voltage applied to the input terminal 1. In the conducting state of the NPN transistor 4, the output terminal 3 is grounded through a very low collector-emitter saturation resistance, but in the cutoff state of the transistor 4, a slight capacitive load would cause deterioration in the output wave form because the supply voltage +E appears at the output terminal 3 through the resistor 5 having a considerably high resistance value. As the speed of operation of the circuit becomes increasingly higher, a serious problem would be given rise to in the inverter circuit of such a simple structure even with the presence of a capacitive load of several picofarads. Perfect elimination of such a capacitive load is impossible in view of the presence of the junction capacitance in the transistor 4 and the stray capacitance in the transmission line connected with the output terminal 3. In a method most conventionally employed hitherto, the resistance value of the collector resistor 5 is lowered to reduce the output impedance for the output terminal 3, but this method is defective in that the overall power consumption of the circuit becomes higher and there is a certain inevitable limitation to the reduction of the resistance.

Figure 2:
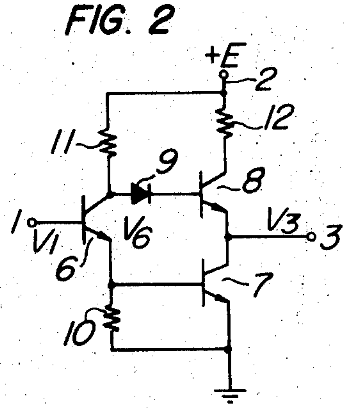
FIG. 2 is a diagram illustrating the basic configuration of a conventional pulse amplifying and inversion circuit of the totem pole type.

Another method priorly widely used to avoid the above defect will be described with reference to FIG. 2 illustrating a pulse amplifying and inversion circuit of the totem pole type, which includes an input terminal 1 connected to the base of an NPN transistor 6, a terminal 2 for applying a collector supply voltage +E, an output terminal 3, NPN transistors 7 and 8, a diode 9, and resistors 10, 11 and 12 having respective predetermined functions. In FIG. 2, the collector resistor 5 in FIG. 1 is replaced by the transistor 8 of an emitter follower configuration and the base resistor 11 for the transistor 8, and the resistor 12 serves as a protective resistor, while the transistor 7 is operative to quickly discharge the charge stored up to a voltage level of "1" in the capacitive load described above. The circuit shown in FIG. 2 is mainly used to form the last stage circuit of the high speed DTL or high speed TTL and is generally called a totem pole type circuit.

Figure 3:
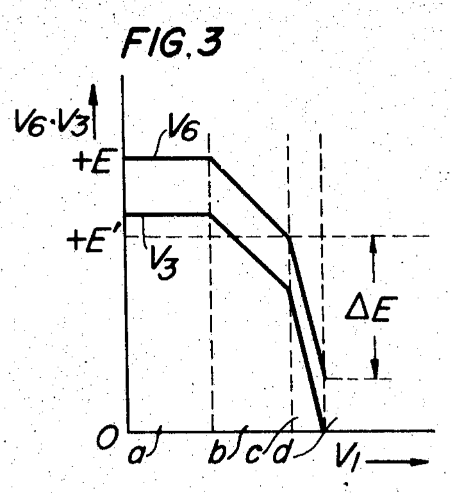
FIGS. 3 and 4 are graphic illustrations of the operation of the circuit shown in FIG. 2.
Figure 4:
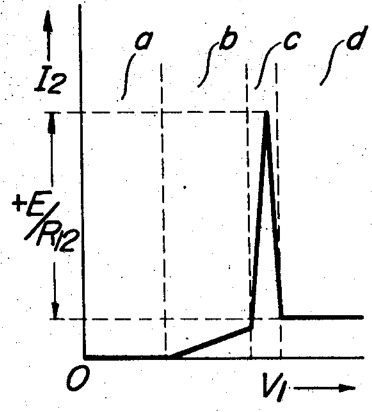

The operation of the circuit shown in FIG. 2 will be described hereunder supposing that $V_1$, $V_3$ and $V_6$ designate an input voltage applied to the input terminal 1, an output voltage delivered from the output terminal 3, and a collector voltage of the transistor 6, respectively. In FIGS. 3 and 4, the operating characteristics of the circuit shown in FIG. 2 are divided into four regions, *a*, *b*, *c* and *d*, with the break points of the voltages $V_3$ and $V_6$ relative to the voltage $V_1$ taken as boundaries therebetween. In the region *a*, the transistors 6 and 7 are in their cutoff state while the transistor 8 is in its active (or saturated) state; in the region *b*, the transistors 6 and 8 are in their active state while the transistor 7 remains still in its cutoff state; in the region *c*, all the transistors 6 to 8 are in their active state (or the transistors 7 and 8 are in their saturated state while the transistor 6 remains in its active state); and in the region *d*, the transistors 6 and 7 are in their saturated state while the transistor 8 is in its cutoff state.

In the region *a* specified above, the voltage $V_3$ appearing at the output terminal 3 has a value E' which is lower than E by the sum of the forward threshold voltage of the diode 9 and the base-emitter threshold voltage of the transistor 8. In the region *b*, the transistor 6 is urged to its active state so that the collector current starts to flow. As a result, a voltage drop across the collector resistor 11 for the transistor 6 takes place, and the reduction in the collector voltage $V_6$ results in a reduction in the output voltage $V_3$ at the output terminal 3, the output voltage $V_3$ varying depending on a variation in the collector voltage $V_6$ of the transistor 6. However, no collector current flows through the transistor 8 since the transistor 7 is still held in its cutoff state.

In the region *c*, the transistor 7 is urged to its active state to provide a path for the emitter current of the transistor 8 with the result that a current starts to flow across the transistors 7 and 8 until finally a so-called spike current which is limited by the protective resistor 12 and which can approximately be given by $E/R_{12}$ (where $R_{12}$ is the resistance value of the protective resistor 12) flows across the circuit. Upon transition to the region $d$, the transistors 6 and 7 are urged to their saturated state, and the diode 9 and the transistor 8 are quickly shifted to their cutoff state with the result that the current flowing across the circuit is abruptly decreased to shift to its stationary state in the region $d$. Therefore, the current $I_2$ flowing through the supply terminal 2 of the collector supply voltage +E varies relative to the input voltage $V_1$ in a manner as shown in FIG. 4. In other words, the high output level inverter circuit of the totem pole type shown in FIG. 2 has two inherent defects, that is, the undesirable decrease in the noise margin due to the drop of the output voltage $V_3$ in the region $b$ and the appearance of the spike current in the region $c$, as will be apparent from FIGS. 3 and 4.

The spike current described above may be eliminated by connecting a plurality of diodes 9 in series or by enlarging the resistance value of the resistor 11 so as to have a steep gradient of the voltages $V_3$ and $V_6$ in the region $b$ to thereby reduce the voltage E′ appearing at the output terminal 3 at the beginning of the region $c$. However, this method is unfit for a high output level inverter circuit which must operate at a high speed and at a high output level. The diode 9 is a level shifting element which is inserted in order to positively ensure the cutoff of the transistor 8, but any other level shifting element may be employed in lieu of the diode 9. The function of such a level shifting element will be the same when it is disposed at the existing position of the diode 9 or it is disposed in the emitter circuit of the transistor 8. It is to be understood that neither the position nor the type of such a level shifting element is an essential condition in the present invention.

The present invention contemplates the provision of a high output level inverter circuit of novel structure which is free from the defects inherent in the prior art high output level inverter circuit of the totem pole type, that is, the undesirable spike current and the deterioration of the noise margin and which is additionally provided with means for executing the logical function of wired OR circuits.

A few embodiments of the high output inverter circuit according to the present invention are illustrated in FIGS. 5, 6, 7$a$ and 7$b$, in which like reference numerals are used to denote like parts appearing in FIG. 2. In FIGS. 5, 6, 7$a$ and 7$b$, the reference numerals 13 and 19 designate transistors, 14 designates a diode, and 15 designates a resistor.

The improvement in the spike current and the noise margin effected by the embodiment shown in FIG. 5 will first be described with reference to FIGS. 8 and 9. In FIG. 5, application of a positive input voltage $V_1$ to an input terminal 1 causes a corresponding variation in a collector voltage $V_6$ of a transistor 6 and an output voltage $V_3$ at an output terminal 3 as shown in FIG. 8. A transistor 13 in the circuit operates in a manner similar to the transistor 6, that is, the transistor 13 is in its cutoff state in regions $a$ and $b$, in its active state in a region $c$, and in its saturated state in a region $d$.

In the region $c$ in which a spike current should occur, a transistor 7 is urged to its active state to allow for flow of current, and at the same time, the transistor 13 is also urged to its active state to allow for flow of current through a loop including a resistor 11 and diodes 9 and 14. Accordingly, a larger current can flow through the resistor 11 by the presence of the transistor 13 than when transistor 13 is not provided, and as a result, the potential at a point P in FIG. 5 is further reduced to such an extent that both the transistors 7 and 8 are simultaneously urged to their saturated states to prevent flow of the undesirable spike current. More precisely, the current flowing across the diode 14 and the transistor 13, hence, the spike current limited by the collector resistor 11, is reduced to an extent which is approximately given by $\Delta E/R_{11}$, where $\Delta E$ is an amount of variation of the collector voltage $V_6$ of the transistor 6 in the region $c$ and $R_{11}$ is the resistance value of the collector register 11. Therefore, the current $I_2$ flowing through a terminal 2 to which a supply voltage +E is applied varies relative to the input voltage $V_1$ in such a manner as shown in FIG. 9, from which it will be seen that the undesirable spike current can substantially be eliminated.

The circuitry shown in FIG. 6 is slightly different from the circuitry shown in FIG. 5 in that a resistor 15 is interposed between the point P and the supply terminal 2 of the supply voltage +E. This resistor 15 is provided in order to improve the undesirable deterioration of the noise margin in the totem pole type circuit. More precisely, the resistor 15 is operative to prevent the lowering of the output voltage $V_3$ at the output terminal 3 in the region $b$ shown in FIG. 3. The effectiveness of the provision of the resistor 15 will be apparent from the fact that the diode 9 is held in its cutoff state even with a reduction in the collector voltage $V_6$ of the transistor 6 since the supply voltage +E is applied through the resistor 15 to the cathode side of the diode 9, and the output voltage $V_3$ is not reduced until both the transistors 13 and 7 are urged to their conducting state. It will thus be apparent that the collector voltage $V_6$ of the transistor 6 and the output voltage $V_3$ at the output terminal 3 vary in a manner as shown in FIG. 8. The effectiveness of the circuitry shown in FIG. 6 for the elimination of the undesirable spike current will be easily understood and therefore will not be described herein because the circuit shown in FIG. 6 operates on the same principle as that of the circuit shown in FIG. 5. The diode 14 is provided in order to effect a balance between the impedance of a loop which is traced from the point P in FIGS. 5 and 6 through the transistors 7 and 8 to ground and the impedance of a loop which is traced from the point P through the transistor 13 to ground.

FIGS. 7$a$ and 7$b$ are modifications of the totem pole type circuit shown in FIG. 6 and represent such a circuitry in which the diode 9 in FIG. 6 is removed and the diode 14 in FIG. 6 is short-circuited. In FIG. 7$a$, it will be seen that the transistors 7 and 13 in FIG. 7$b$ are removed and in lieu thereof a multicollector transistor 19 having collector terminals 20 and 21 is provided. Since, in the circuits shown in FIG. 7$a$ and 7$b$, the transistors 13 and 19 can have their cutoff, active and saturated states simultaneously in the region $c$ in FIG. 8, as already described with reference to FIGS. 5 and 6, the transistor 8 is urged to its active (or saturated) state only when the transistors 13 and 19 are in their cutoff state, while when the transistors 13 and 19 are in their active or saturated state, the transistor 8 is not urged to its active or saturated state unless its base potential relative to its emitter potential exceeds the emitter-base threshold voltage level. Thus, the transistors 8 and 7 do not establish a current path for the spike current, and the spike current can not occur.

A terminal 16 in FIGS. 7$a$ and 7$b$ is called herein a logic terminal which has a logical function of executing the logic of a wired OR circuit as will be described below with reference to FIG. 10.

The circuitry shown in FIG. 10 comprises a parallel connection of circuits 30 and 31 which are each equivalent to the circuit shown in FIG. 7$a$. The logic terminals in the circuits 30 and 31 are connected with each other by a wire 32 for the execution of the wired OR logic. The logic terminals are at the same potential and the connecting wire 32 therebetween is left independent of the operation when output terminals 33 and 34 are both at their low level or the level of the collector saturation voltage which is taken as the logical value "0", or when these output terminals are both at their high level or at the level of the supply voltage +E which is taken as logical value "1". When however one of the output terminals is at the logical value "1" and the other is at the logical value "0", the output terminal of the circuit having the logical value "1" is urged to take the logical value "0". Under such a state, the emitter follower transistor in this circuit is urged to its cutoff state, but any trouble is not thereby imparted to the circuit operation. In accordance with the circuitry shown in FIG. 10, the output terminals 33 and 34 of the respective circuits 30 and 31 are connected with each other in order to eliminate any deterioration of the output wave form even in the presence of a capacitive load as will be understood from the foregoing description. It will be apparent that, when input informations $A_i$ and $A_j$ ("1" or "0") are supplied to the respective circuits 30 and 31, the logical product $A_i \cdot A_j$ appears at their output terminals 33 and 34.

Another embodiment shown in FIG. 12*a* includes therein the inverter circuit of the present invention which is arranged to constitute a part of a TTL configuration similar to the prior art TTL configuration. FIG. 12*b* is a symbolic representation of the circuitry shown in FIG. 12*a*. More precisely, the circuitry shown in FIG. 12*a* comprises a gate circuit 35 for the TTL, an emitter follower circuit 36 which serves as a buffer circuit, and an inverter circuit 37 constructed in accordance with the present invention, and is adapted to execute the NAND logic. From the symbolic representation shown in FIG. 12*b*, it will be seen that the NAND circuit has a plurality of input terminals 38, a single output terminal 39 and a logic terminal 40.

A plurality of, say, *n* logic circuits each having a circuitry as shown in FIG. 12*a* may be connected in a manner as shown in FIG. 11, in which it will be seen that logic terminals of the logic circuits are connected with one another. An output X appearing from a single output terminal of such logic circuit can be given by $$X = \overline{(A_1B_1 \ldots C_1)} \cdot \overline{(A_2B_2 \ldots C_2)} \cdot \ldots\ldots \cdot \overline{(A_nB_n \ldots C_n)}$$

when input informations $A_1, B_1, \ldots, C_1; A_2, B_2, \ldots, C_2; \ldots\ldots; A_n, B_n, \ldots\ldots C_n$ are supplied to respective input terminals.

Figure 7B:
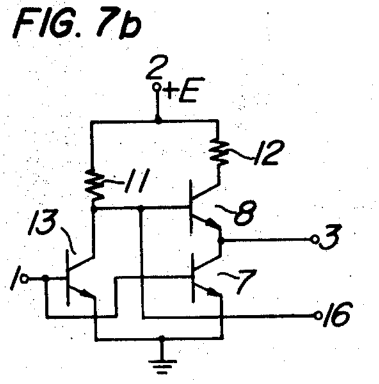

The logic terminal in the present invention is in no way limited to the form of the logic terminal 16 shown in FIGS. 7*a* and 7*b*, and it will be apparent that such a logic terminal may be provided in the circuitry shown in FIGS. 5 and 6 by merely deriving an output terminal from the collector terminal of the transistor 13.

From the foregoing description, it will be appreciated that the present invention provides a novel inverter circuit which is free from any wave form distortion and any spike current, and a logical function can be executed at the output side of the circuit by merely affixing a logic terminal thereto. It will be apparent that the present invention is applicable to the construction of integral circuits, and a PNP transistor and a PNP multicollector transistor may be employed therein in lieu of the NPN transistor and the NPN multicollector transistor referred to hereinabove.

We claim:

1. A high output level inverter having an output circuit of the totem pole type including a first transistor and a second transistor, said inverter comprising a series circuit of a diode and a third transistor which is connected between the base of said first transistor in said output circuit of the totem pole type and ground, the base of said third transistor being connected in parallel with the base of said second transistor in said output circuit of the totem pole type.

2. A high output level inverter according to claim 1, further comprising a resistor connected between a power supply and the junction point between the base of said first transistor and said diode.

3. A method of constructing a high speed logic circuit comprising a plurality of inverters each having an output circuit of the totem pole type and a driving circuit therefor, each said output circuit of the totem pole type including therein a transistor which serves as an emitter follower and whose collector terminal is connected to a power supply through a resistor, characterized by constructing said driving circuit in such a manner that said driving circuit includes therein at least one transistor whose collector is operative at a level substantially same as the operating level of the emitter of said emitter follower transistor, deriving a logic terminal from said collector of said transistor included in each said driving circuit, and connecting said logic terminals in common with each other and output terminals of said output circuits in common with each other so as to afford the logic function of wired OR to said high speed logic circuit.

4. A high output level inverter for use in a binary logic circuit having a power supply connected thereto, an output circuit including a first transistor and a second transistor connected in a totem pole configuration and coupled to said power supply, with the output taken from a common connection between said first and second transistors, and a driver circuit comprising a third transistor having its base and emitter connected in parallel with the base and emitter of said second transistor, whereby an auxiliary current path is provided by said driver circuit, so that current spikes from the power supply are substantially reduced.

5. A high output level inverter according to claim 4, wherein the collector of said third transistor is coupled to the base of said first transistor, said first transistor being connected in an emitter follower configuration.

6. A high output level inverter according to claim 5, wherein the collector of said third transistor is coupled to the base of said first transistor by means of a diode.

7. A high output level inverter according to claim 6, wherein said driver circuit further includes a resistor connected between the junction of said diode and the base of said first transistor and said power supply, whereby deterioration of the noise margin of said totem pole configuration of said first and second transistors is substantially reduced.

8. A high output level inverter according to claim 5, wherein the collector of said third transistor is coupled to the base of said first transistor by means of a short circuit.

9. A high output level inverter according to claim 8, wherein said second and third transistors are formed of a single multicollector transistor.

10. A binary logic circuit comprising a plurality of high output level inverters of the type recited in claim 12, having respective outputs connected in common, and further having the bases of their respective first transistors connected together, to thereby form a logical OR circuit.

11. A binary logic circuit comprising a high output level inverter of the type recited in claim 9, connected to the output of a multiemitter gate transistor which is connected in series with an emitter follower buffer circuit to thereby form a NAND circuit.